H. H. Macklin,
Rotary Churn

Nº 70,009.  Patented Oct. 22, 1867.

Witnesses:
J. W. Burridge
Frank S. Alden

Inventor:
H. H. Macklin

United States Patent Office.

H. H. MACKLIN, OF NEW SPRINGFIELD, OHIO.

Letters Patent No. 70,009, dated October 22, 1867.

IMPROVEMENT IN CHURNS.

The Schedule referred to in these Letters Patent and making part of the same.

TO ALL WHOM IT MAY CONCERN:

Be it known that I, H. H. MACKLIN, of New Springfield, in the county of Mahoning, and State of Ohio, have invented certain new and useful Improvements in Churns; and I do hereby declare that the following is a full and complete description of the same, reference being had to the accompanying drawings, making a part of this specification, in which—

Like letters of reference refer to like parts in the views.

Figure 1:
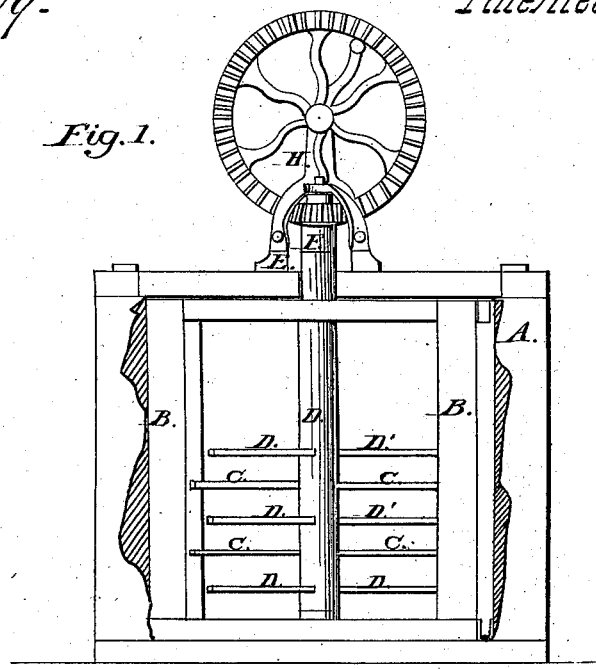
Figure 1 is an inside view of the churn.
Figure 2:
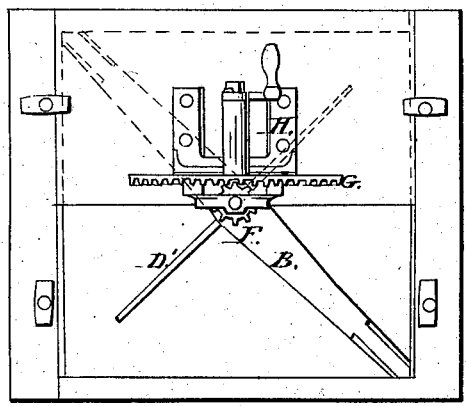
Figure 2 is a view of the top.

A, fig. 1, represents the box or body of the churn, diagonally across the inside of which is a frame, B, as shown in fig. 2. In this frame is arranged a series of breakers, C, projecting inward toward the spindle or shaft D, and from which spindle project corresponding arms or beaters, D', so arranged as to pass between the breakers, as shown in fig. 1. The foot of said shaft is pivoted in the frame and supported at the upper end of a yoke, E, and on which upper end is keyed a pinion, F, made to engage in the cog-wheel G secured to the top of the churn in a stay, H, fig. 2.

It will be obvious that by fitting the frame in the angles of the churn, as shown, a greater length of frame is obtained, and hence longer breakers to act upon the cream. It is also attended by less expense, as no cleats or grooves are required by which to hold the frame, which would be necessary if placed directly across from one side to the other. It is also much easier cleaned, as there are no extra corners in which the cream can lodge or adhere; and as the frame and spindle are removed from the churn together, the inside is left free and smooth, so that the butter can be conveniently reached and worked. This churn is very easily operated, in consequence of the beaters being made small or narrow, at the same time thoroughly agitating the cream, whereby the butter is speedily brought.

What I claim as my improvement, and desire to secure by Letters Patent, is—

The special construction of the adjustable frame B and breakers C, in combination with the shaft D, beaters D', and box A, when arranged and operated in the manner substantially as described.

H. H. MACKLIN.

Witnesses:
ANDREW SHALE,
LEVI HISEY.